Dec. 23, 1952     E. T. EATON     2,622,345
SEED DRIER

Filed April 3, 1950     2 SHEETS—SHEET 1

INVENTOR.
EARL T. EATON
BY
ATTORNEY

Dec. 23, 1952 E. T. EATON 2,622,345
SEED DRIER
Filed April 3, 1950 2 SHEETS—SHEET 2
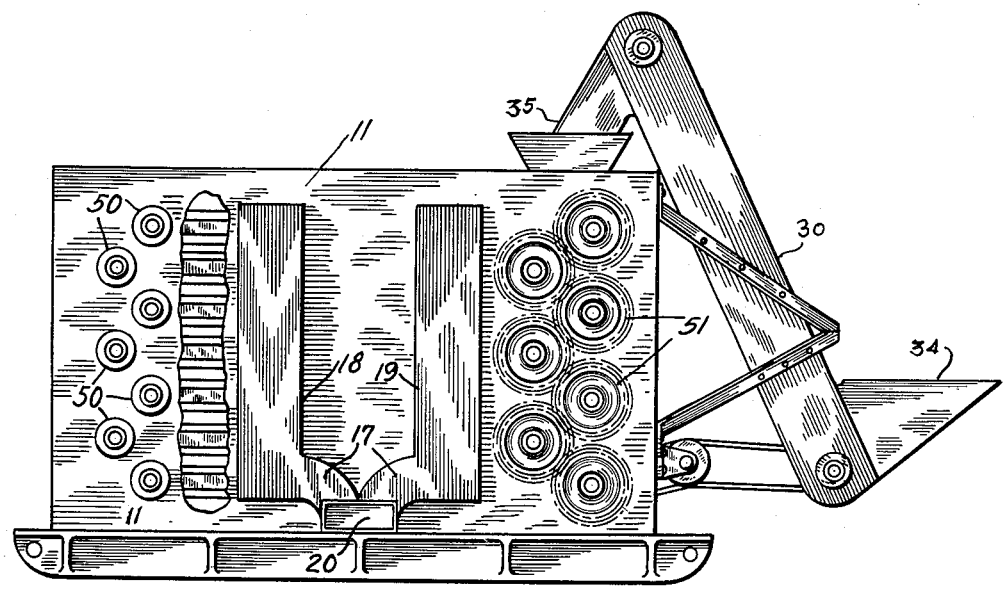
FIG. 4.
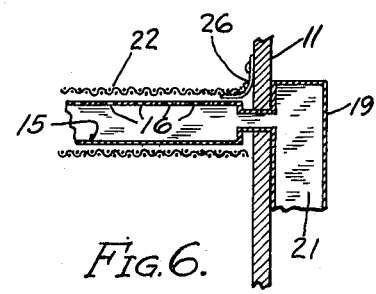
FIG. 6.
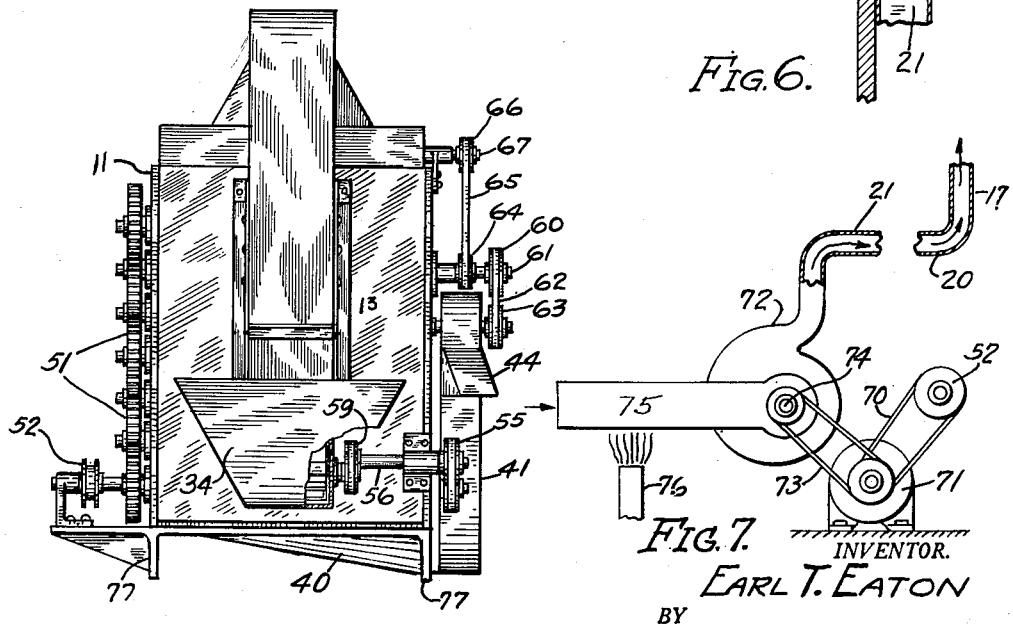
FIG. 5.
FIG. 7.
INVENTOR.
EARL T. EATON
BY
Anderson & Muller
ATTORNEY Patented Dec. 23, 1952

2,622,345

UNITED STATES PATENT OFFICE 2,622,345

SEED DRIER

Earl T. Eaton, Canon City, Colo.

Application April 3, 1950, Serial No. 153,568

1 Claim. (Cl. 34—203)

This invention relates to driers and more particularly to improvements in driers for seed such as melon seed, grain, and the like.

One of the objects of the invention is to provide a drier with superposed successive drying flights and conveyor means associated therewith for feeding seeds from a convenient loading station and discharging them after being dried at a convenient discharge station where they may be sacked or otherwise packaged.

Another object is to provide a novel feeding conveyor for the drier.

Another object is to provide a novel discharge conveyor for the drier.

Another object is to provide a drier, the flights of which are supplied with drying air from a common manifold.

Another object is to provide the flights with novel means for delivering the drying air to foraminous endless conveyor belts associated therewith.

Other objects are to provide the flights with suitable means for preventing the seeds from falling over the edges or ends of the flights to ensure that all material passes along the full length of all flights to thus prevent any seeds from passing through the drier without being thoroughly dried.

Still further objects, advantages, and salient features will become more apparent from a consideration of the description to follow, the appended claims, and the accompanying drawing, in which:

Figure 1 is a side elevation of the drier as viewed from plane 1—1, Figure 2, portions being broken away and other portions shown in section on line 1a—1a;

Figure 4 is a side elevation as viewed from line 4—4, portions being broken away;

Figure 5 is an end elevation as viewed in the direction of arrow 5, Figure 2, a portion being broken away;

Figure 6 is a section taken on line 6—6, Figure 2; and

Figure 7 is a diagrammatic view showing the air heater for the drier and certain power transmission means for the drier and air heater.

Figure 1:
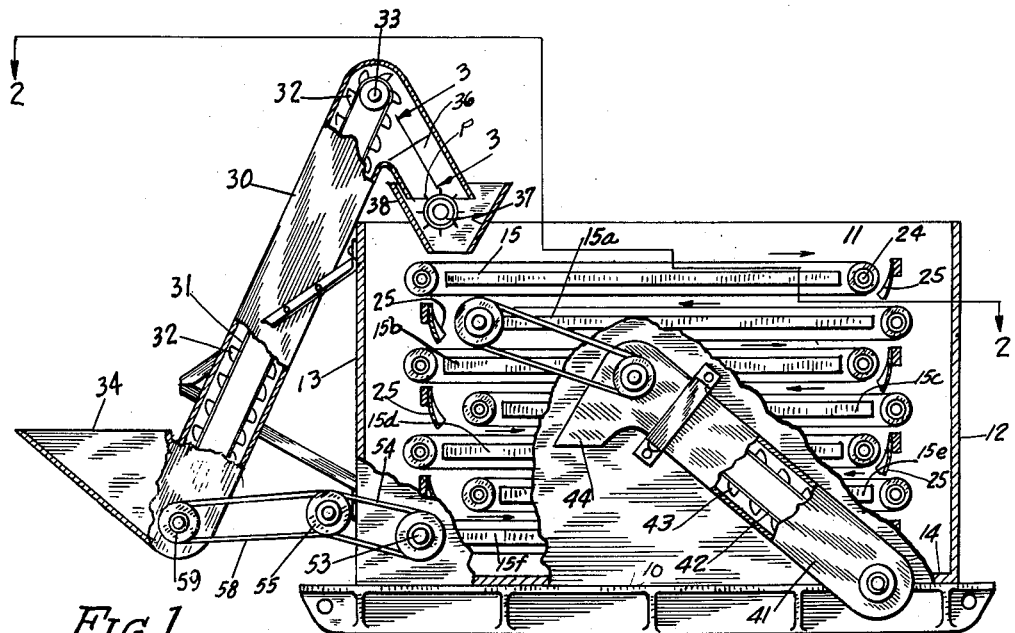

Referring in detail to the drawing, the drier comprises a pair of side walls 10, 11, end walls 12, 13, and a bottom wall 14, these walls forming a rectangular casing which is shown as being open at the top, but which may be closed if desired, and suitably vented to permit escape of air from the casing. A plurality of elongated horizontally disposed relatively thin conduits 15, 15a, 15b, 15c, 15d, 15e and 15f extend between the walls 10, 11, the upper wall of each being provided with a plurality of apertures 16 to permit drying air to escape upwardly from each conduit. A manifold 17 having air delivery ducts 18, 19 is disposed on the outside of wall 11, these ducts communicating with the horizontally disposed conduits previously described at spaced points along their length. The lower end of the manifold has a connection 20 to which a flexible or other conduit 21 (see Figure 7) may be secured for delivering heated air to the manifold and horizontally disposed conduits.

An endless foraminous belt 22 of wire screen, or the like, is associated with each horizontal conduit, the upper and lower runs of each belt being disposed on opposite sides of an air conduit and the ends passing around rolls 23, 24, as shown for the belt of the top flight, it being understood that the belts and conduits for the various drying flights are all the same. As best shown in Figure 1, the right end of the top belt in the top flight terminates to the left of the right end of the belt in the second flight so that seeds delivered over the end of the former will fall onto the latter. To ensure that all seeds are delivered to a succeeding belt, deflector plates 25 are provided adjacent the ends of each flight to deflect the seeds from one flight to the next lower flight. To prevent any spillage of seeds along each belt at the edges thereof, curved plates 26 (see Figure 6) are secured to each of walls 10, 11 these plates being substantially the length of a flight and which engage and bend the edges of the upper runs of the belt upwardly to thus form slight flanges at these edges which prevents spillage of seeds thereover.

A feeding conveyor 30 is disposed at one end of the drier, this conveyor having an endless belt 31 therein with scoops 32 secured thereto, the belt being enclosed in the conveyor casing and supported therein at its ends by rolls, the upper one being shown at 33, a similar roll being provided at the lower end. The lower end of the conveyor casing is provided with a hopper 34 for receiving a quantity of seeds which may be shoveled or dumped therein. The upper end of the conveyor has a downwardly and outwardly flaring portion 35 having a plurality of baffles 36 which distribute the seeds to substantially the full width between the edges of the top foraminous belt, these being fed onto the latter by a roll 37 having paddles P thereon, the roll being rotatably mounted in a trough 38, the inner walls of which are engaged by the paddles, which latter may be of flexible material.

A chute 40 is secured to the lower wall 14 of the drier below the delivery end of the lowermost flight, that is, at the right end of Figure 1. The bottom of the chute is disposed at an angle, as shown in Figure 5, and seeds falling therein gravitate to a discharge conveyor 41 having a conveyor belt 42 with scoops 43 thereon, this belt being similar to the belt in the feeding conveyor and similarly mounted therein. The upper end of this conveyor is provided with a downwardly extending mouth 44 through which the seeds are delivered to a sack or other container.

Figure 2:
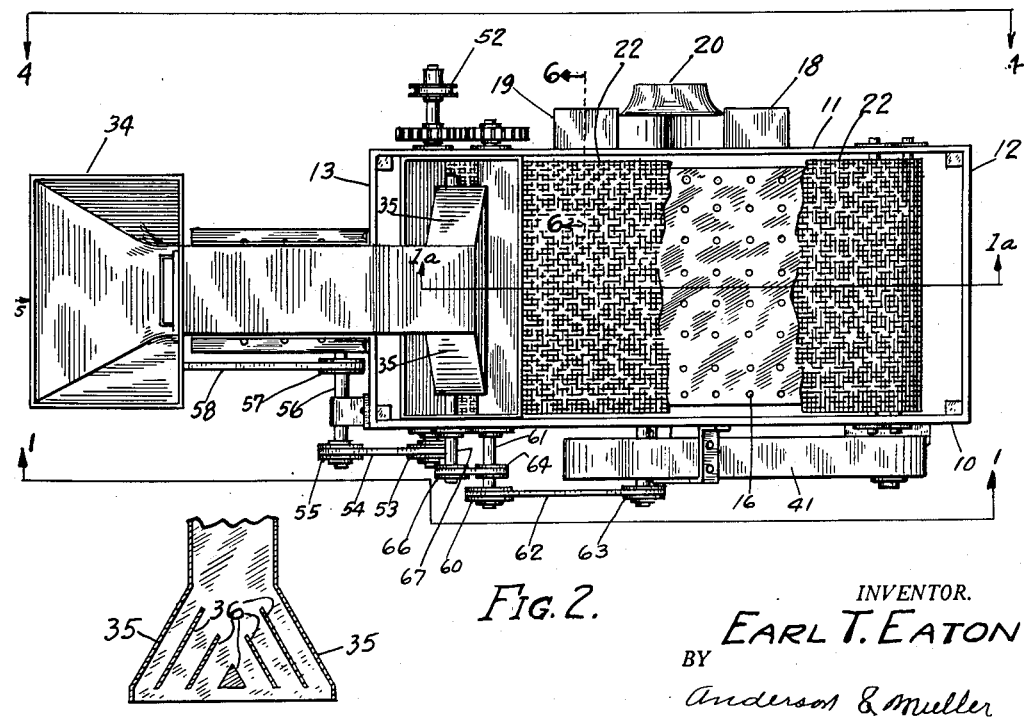
Figure 2 is a section taken on line 2—2, Figure 1.
Figure 3:
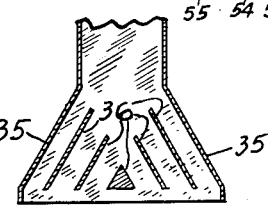
Figure 3 is a section taken on line 3—3, Figure 1.

The supporting rolls for the foraminous belts are journaled on the side walls 10, 11 of the casing, as shown by bearings 50 (see Figure 4), and by similar journals at their other ends. As shown in Figure 4 the various rolls are geared together with a gear train 51 which effects movement of successive upper runs of the belts in opposite directions as shown by the arrows in Figure 1. The lowermost gear of this train is driven by a pulley 52 connected thereto as best shown in Figures 2 and 5. The feeding conveyor is driven from one of the foraminous belt rolls by pulley 53, belt 54, pulley 55, shaft 56, pulley 57, belt 58, and pulley 59, the latter being connected to the lower roll over which conveyor belt 31 is trained. The discharge conveyor belt 42 is similarly driven by a pulley 60 connected to one of the foraminous belt rolls by shaft 61, a belt 62, and a pulley 63, the latter being connected to the upper roll over which belt 42 is trained. The feeder roll 37 is driven by pulley 64 on shaft 61, belt 65 and pulley 66, the latter being connected to the feeder roll by shaft 67.

Pulley 52 (see Figure 7) is driven by a belt 70 connected to a motor 71, the latter also driving a fan 72, by belt 73 and pulley 74, the fan receiving air from a heat exchanger 75, heated by a burner 76, and delivering it to mouth 20 of the manifold through conduit 21.

The drier casing may be supported in any manner desired. I have shown a pair of skids 77 for this purpose on which the device may be dragged. Wheels may be substituted if desired. Belts and pulley have been described for the various power transmission connections; however, this is exemplary only and chains and sprockets, or other power transmission means may be employed in their stead. Motor 71 may be electric, if electric power is available, or an internal combustion motor, or other prime mover.

If the seeds to be dried are watermelon, cantaloupe, or other melon seeds, the foraminous belts may be made of sufficiently large mesh screen to permit free access of drying air thereto but of a mesh such that the seeds will not fall through the interstices of the screen. For smaller seeds such as grain, etc., it will be apparent that the mesh of the screen will be finer.

Having described the invention, what I claim as new is:

In a seed dryer of the type comprising a housing having a plurality of vertically-spaced flights of endless woven fabric aprons mounted on spaced end rollers, one roller of each pair being power driven for moving the upper surfaces of adjacent flights in opposite direction, the flights being offset longitudinally so that the seed discharged from the upper apron of a flight will drop onto the upper apron of the flight next below which moves in the opposite direction, air distributing means comprising conduits positioned between the aprons of each flight, the upper surfaces of the conduits being perforated to discharge heated air against the under surface of the top apron of each flight, the combination with the above of strips of material attached to the inside of the housing directly beneath the edges of the top apron of each flight lapping the apron forming supports for the edges thereof and forming also means preventing seeds from falling over the edges of the apron, means for feeding moist seed onto the upper apron of the topmost flight near one end thereof and for distributing it uniformly over the entire width of the flight apron, comprising a hopper positioned over the receiving end of the topmost flight, a feed roller in the hopper, said roller having a length substantially equal to the width of the apron, means for turning said roller, a feed elevator terminating above the roller and means positioned between the discharge end of the elevator and the top of the roller for effecting a distribution of the seed along the entire length of the roller.

EARL T. EATON.

REFERENCES CITED

The following references are of record in the file of this patent:

UNITED STATES PATENTS

| Number | Name | Date |
|---|---|---|
| Re. 10,978 | Cormack | Jan. 1, 1889 |
| 289,635 | Farrington | Dec. 4, 1883 |
| 312,341 | Duryea | Feb. 17, 1885 |
| 1,254,431 | Pierce | Jan. 22, 1918 |
| 1,520,187 | Lawson | Dec. 23, 1924 |
| 2,350,096 | Chilton | May 30, 1944 |

FOREIGN PATENTS

| Number | Country | Date |
|---|---|---|
| 494,946 | Great Britain | Oct. 31, 1938 |